June 5, 1934.  H. H. RAYMOND  1,961,892
ASSORTING APPARATUS
Filed Nov. 29, 1930   5 Sheets-Sheet 1
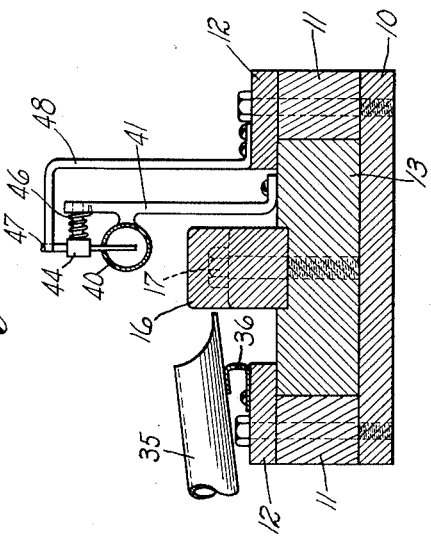
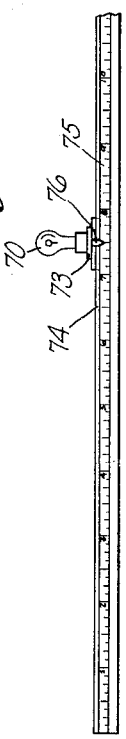
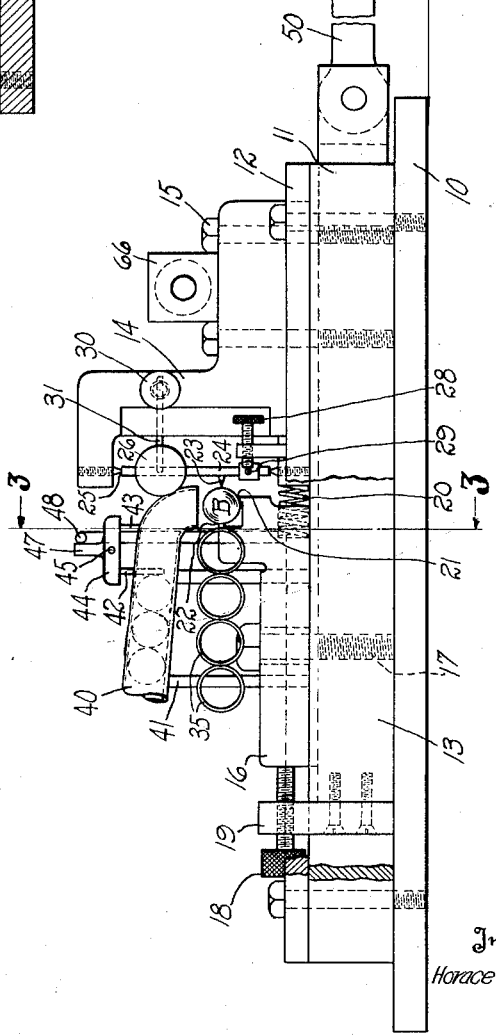
Inventor
Horace H. Raymond
By T. Clay Lindsey
Attorney

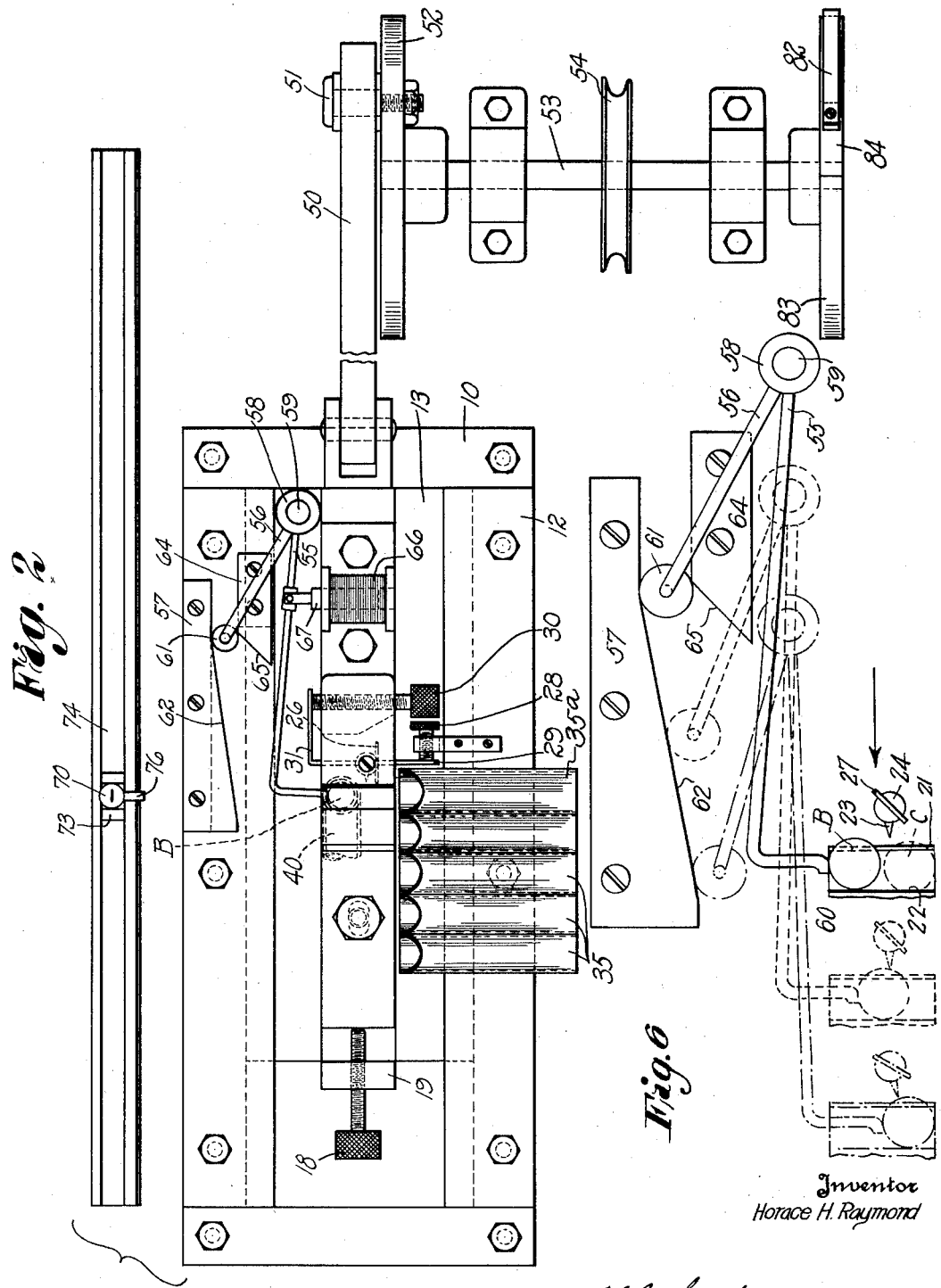

June 5, 1934.  H. H. RAYMOND  1,961,892
ASSORTING APPARATUS
Filed Nov. 29, 1930    5 Sheets-Sheet 3

Inventor
Horace H Raymond
By W. Clay Lindsey,
Attorney

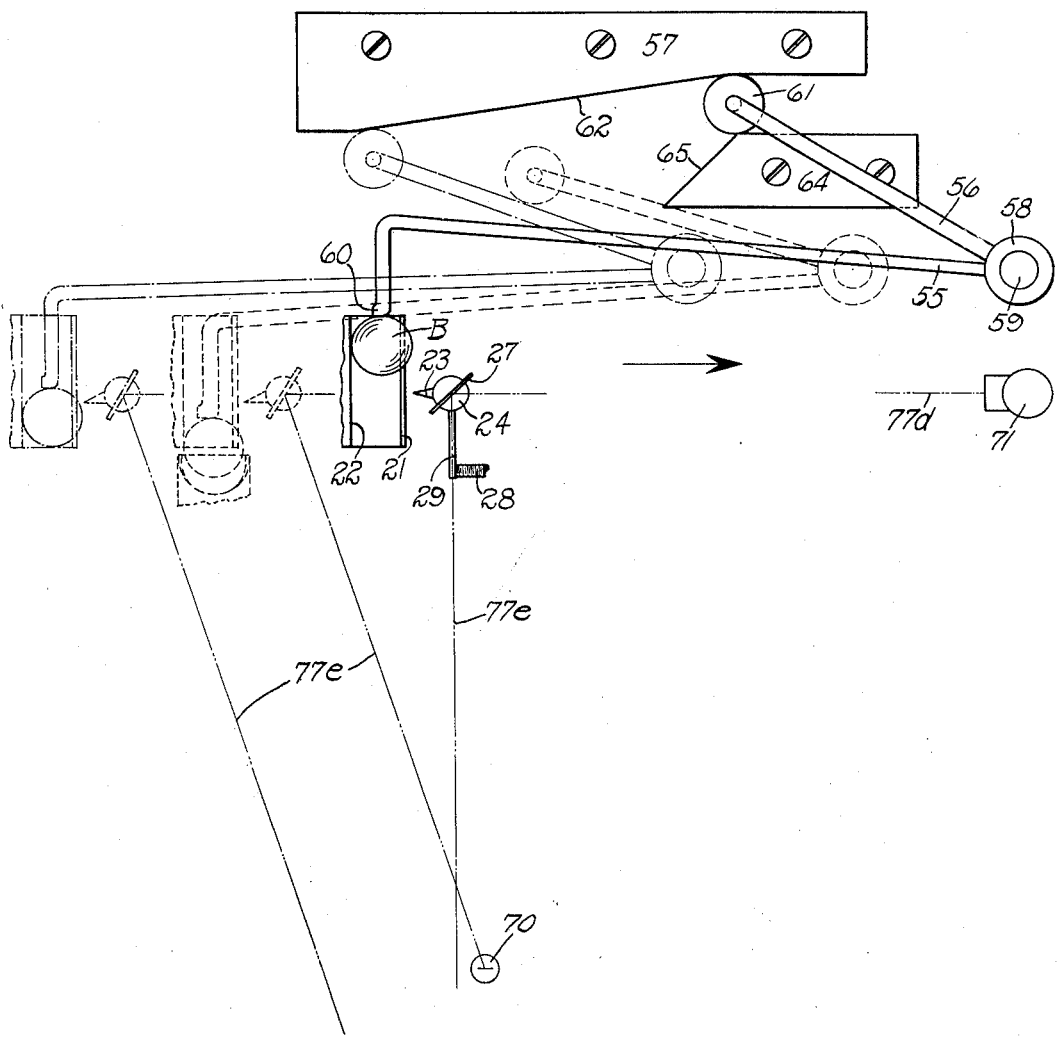

June 5, 1934.    H. H. RAYMOND    1,961,892
ASSORTING APPARATUS
Filed Nov. 29, 1930    5 Sheets-Sheet 5
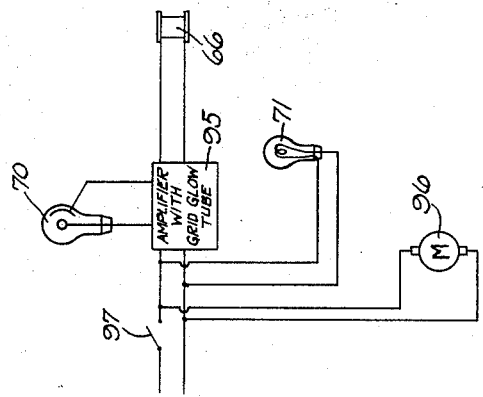
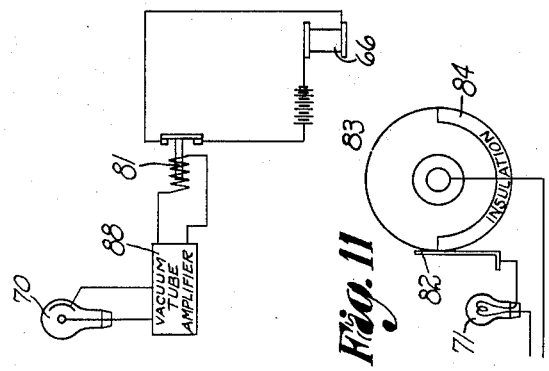
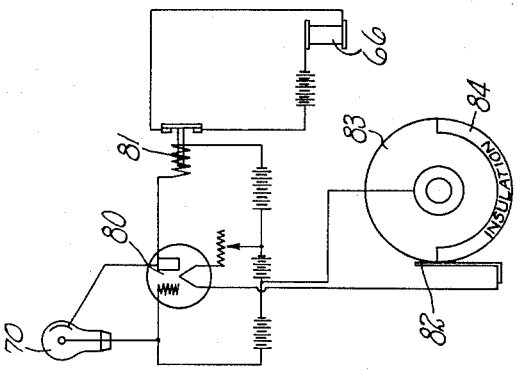
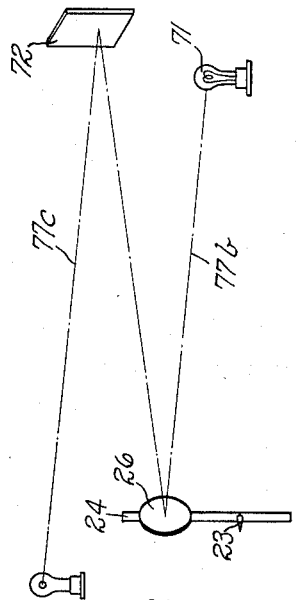
Inventor
Horace H. Raymond
By K. Clay Lindsey
Attorney Patented June 5, 1934

1,961,892

UNITED STATES PATENT OFFICE 1,961,892

ASSORTING APPARATUS

Horace H. Raymond, Berlin, Conn., assignor to The Stanley Works, New Britain, Conn., a corporation of Connecticut Application November 29, 1930, Serial No. 499,023

22 Claims. (Cl. 209—88)

This invention relates to an apparatus for assorting articles according to size.

As an instance of a use to which the machine of the present invention may be applied, reference may be had to the assorting of bearing members, such as ball or roller bearings, where uniformity in size within very close limits is a prerequisite to the association of such members in an operative structure, the extreme accuracy required being expressed. It is apparent, however, that, while a machine in which the features of the present invention are incorporated is peculiarly adaptable for assorting high precision machine elements, it may be used for separating and grading solid articles of various kinds, according to size.

The object of the invention is to provide an improved machine for automatically sorting articles according to size and which machine is characterized by various features of novelty and advantage.

A further aim of the invention is to provide an apparatus of this sort by means of which articles, varying but slightly in size, may be automatically and expeditiously assorted with accuracy and uniformity into a plurality of groups, the articles of each selected group being uniform in size within extremely minute limits.

A further aim of the invention is to provide a machine of this sort which is exact, sensitive and rapid in the performance of its functions, which is highly practical, which is of a simple nature, and which does not require any high degree of skill on the part of the operator.

In order that the detailed description of the construction of the machine and its mode of operation may be better understood, it may be stated briefly here that the machine has a reciprocating carriage upon which is located a measuring or gauging mechanism to which the bearing balls (or other articles to be measured) are delivered one by one, the gauging mechanism having a gauging element the position of which is determined by the size of the ball as it moves thereby. Associated with this gauging element is a light directing or reflecting device, such as a mirror or a prism, which will be moved, during the gauging operation, to a predetermined angular position depending upon the size of the article being measured. Associated with the carriage and spaced apart longitudinally of the direction of movement thereof is a plurality of fixed stations or receiving members which may be in the form of tubes or channels to which the balls are selectively delivered according to size. There is further provided on the carriage means for ejecting the balls at the several stations and this ejecting means is controlled, through any suitable electrical system, by a light sensitive device (such as a photo-electric cell) which is influenced by a beam of light reflected thereonto by the light reflecting device. A complete reciprocation of the carriage may be considered as one cycle composed of a measuring stroke in one direction of movement and a ball ejecting stroke in the opposite direction. In the operation of the machine, a ball, on the gauging stroke of the carriage, is fed to, and moved past, the gauging means so as to move the reflecting device to an angular position corresponding to the diameter of the ball. During the gauging stroke, the photo-electric cell is rendered inoperative, either by blanking out the beam of light or by rendering the means controlled by the cell inoperative in order that the ball will not be ejected during that stroke. On the reverse or ejecting stroke of the carriage, and at a predetermined point determined by the angularity of the mirror, which in turn has been determined by the gauged ball now to be delivered, the beam of light which falls onto the mirror will strike the photo-electric cell resulting in operation of the ejecting mechanism at that instant that the gauged ball comes opposite the station corresponding to the size of the ball. The optical system is such that variations in sizes of balls, as manifested by the angular positions of the reflector associated with the gauging device, are greatly magnified by a well defined long beam of light between the reflector and the photo-electric cell, thus permitting of great nicety in initial adjustment of the photo-electric cell to a predetermined position. As is well known, a photo-electric cell is extremely sensitive to light rays, and is very uniform and accurate in its operation under light influences.

For convenience and in order that the machine may be better understood in a specific application, the description will proceed on the assumption that balls are to be assorted, it being clear, however, that this assumption is by way of illustration only as the machine is equally adaptable for handling articles of other kinds and shapes, such as cam rolls, tapered bearings, cylindrical bearings, etc., and also other articles not requiring a high degree of precision. Reference is made to certain parts or elements moving relative to other parts or elements, but it is to be understood that the arrangements in certain respects may be reversed without departing from the precepts of the invention. Also, references will be made to certain parts being located in certain planes and positions, but it is apparent that such references are not by way of limitation as they are used merely for coordinating the various parts in the specific embodiment here illustrated. The machine is shown as having five stations to which the articles to be sorted are selectively delivered, but it is apparent that the number of stations will depend upon the character of article handled, the precision with which it is desired to sort those articles, and other factors. Quite obviously, the term "light" is used in its broad or generic sense and is not necessarily limited to light waves which are in the visible range. The term is intended to include invisible rays and rays the waves of which are of various lengths. The device associated with the gauging mechanism for directing the beam of light is referred to as a reflector or a reflecting device, but these terms are intended to include any device, whether electrical, mechanical or otherwise which may reflect, diffract, or bend a ray of light.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein is shown, for illustrative purposes, one of the many embodiments which the present invention may take, Fig. 1 is a front elevational view of the main portions of an apparatus constructed in accordance with the present invention, the electrical arrangement and other parts being omitted as these can best be shown in separate views; and Fig. 1A is a front view of a photo-electric cell and scale associated therewith, this view being positioned above Fig. 1 so as to show the relation of the parts illustrated in these two figures in a practical embodiment;

Fig. 2 is a top plan view of what is shown in Figs. 1 and 1A, taken together;

Fig. 3 is a transverse sectional view taken on line 3—3 of Fig. 1;

Fig. 6 is a diagrammatic layout illustrating the manner in which the article to be measured and assorted moves relative to the gauging device during the measuring stroke of the carriage; and Fig. 7 is a figure similar to Fig. 6 but illustrating movement of the gauged ball and the path of the beam of light during the ejecting stroke of the carriage;

Figure 4:
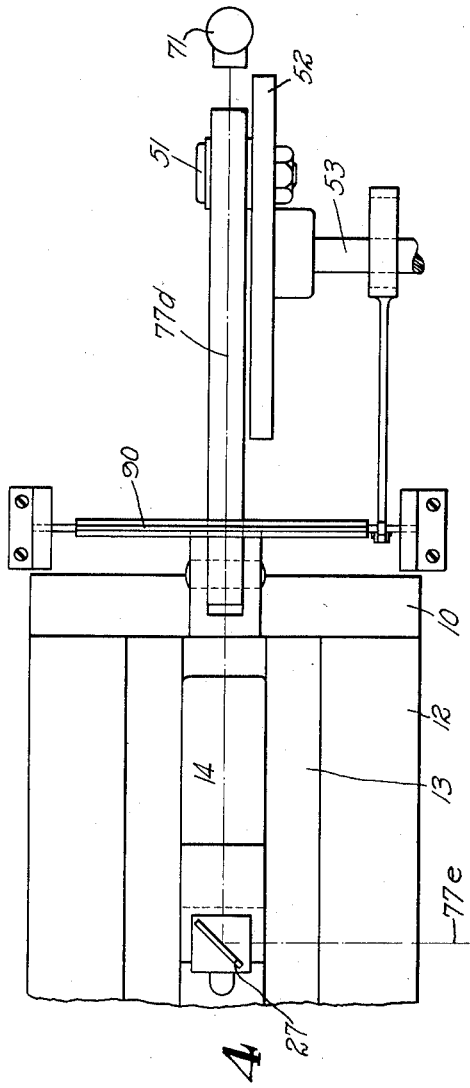
Fig. 4 is a top plan view similar to Fig. 2 and showing a slightly different embodiment of the invention.

Figs. 8, 9, and 10 are schematic diagrams showing various electrical arrangements through which the light sensitive device may control the article ejecting mechanism;

Fig. 11 is a fragmentary view, showing diagrammatically an arrangement by means of which the source of light may be cut off during the measuring stroke of the carriage; and Fig. 12 is a schematic view illustrating an optical system which may be employed in connection with that embodiment of the invention shown in Figs. 1 and 2.

Referring to the drawings in detail, the machine is shown, by way of exemplification, as having a fixed support or bed comprising a base 10, a pair of spaced side guides 11 and gibs 12, as shown most clearly in Figs. 1 and 3. Mounted for reciprocation on the support is a carriage having a main slide 13, a bracket 14 secured to the slide by bolts 15, and a block 16 secured in adjusted position to the slide by a bolt 17. The block 16 may be longitudinally adjusted by a screw 18 threaded in a plate 19 secured to and extending above the left-hand end of the slide 13. The inner end of the screw abuts against the left-hand end of the block. Interposed between the bracket 14 and the block 16 is a compression spring 20 normally holding the block against the end of the screw 18. The gauge block has, at its right-hand end, a transversely extending supporting ledge or surface 21 along which the ball is moved and on which the ball is supported during the gauging operation. Disposed with its plane in right angular relation to the plane of the supporting surface 21, is a gauging surface 22 of an accurate and true nature. The ball engages, during the gauging operation, the surface 22 at a point diametrically opposite that with which the ball is engaged by the other gauging element, which is here shown as being in the form of a relatively short point 23 carried by a shaft or post 24 supported at its top and bottom in bearings 25 for turning movement. The bearings 25 are carried by the bracket 14 and are so constructed as to hold the post 24 very true and with sufficient friction that the post, together with the parts carried thereby, will retain any position to which it is moved until it has been positively moved from that position. In the present instance, the friction between the post and its bearings is alone relied upon for this purpose, but obviously additional friction means may be inserted, if found desirable. Carried by the post is a light reflecting device of any suitable type. In the embodiment shown in Figs. 1, 2, and 12, this reflecting device is in the form of a plane mirror 26 normally set so that it is parallel to the line of movement of the carriage. In the embodiment shown in Figs. 4 to 7 it has the form of a mirror 27 which is normally at forty-five degrees to the line of movement of the carriage. Instead of the mirror 27, a prism may be used. It is seen that during the gauging operation the ball is advanced along the surface 21, that surface being so positioned relative to the line of reference or gauging surface 22 that the ball would be maintained by those two surfaces with the surface 22 engaging the ball substantially midway of its height. The pointer or arm 23 is opposed to the surface 22, and is relatively short in length so that the differences in angular displacement of the point by balls of slightly different diameter will be relatively greater than would be the case if the point were longer.

In order to restore the gauging point to its normal position after a ball has been gauged and ejected, there is provided, on a fixed portion of the machine, an adjustable abutment or screw 28 with which cooperates a pin or arm 29 extending radially and forwardly from the post 24. When the carriage reaches the end of its ejecting stroke (which is the right-hand stroke, referring to the drawings) the arm 29 will engage the screw 28 and turn the post back to where the pointer and mirror have the angular positions shown in Fig. 2. In order to insure that the post is not turned counter-clockwise to too far an extent, there may be provided an adjustable screw 30, the rear end of which is adapted to engage an angled arm 31 carried by the post. By means of the screws 28 and 30 assurance is had that the pointer and mirror are properly set preliminary to a gauging operation.

Spaced apart longitudinally of the direction of movement of the carriage is a plurality of stations to which the balls are selectively delivered according to size, and at each of these stations is a receiving means. The receiving means, of course, may take any suitable form but they are here shown as comprising tubes or conduits 35. These tubes may be fixedly secured to one of the gibs 12 by a bracket 36, and may be extended out so as to deliver to suitable receptacles (not shown). The right-hand tube 35a is adapted to receive balls which in size are above or below the limits between the balls to be sorted.

Any suitable means may be employed for supplying the balls to the gauging mechanism, but, by way of illustration, there is shown, in the accompanying drawings, a tube 40 supported by standards 41 arising from the slide 13. This tube is inclined downwardly towards its delivery end, and its delivery end is positioned above the space between the gauging surface 22 and the supporting surface 21 and rearwardly of the gauge point 23, as shown by full lines in Fig. 1 and by broken lines in Fig. 2. For the purpose of permitting one ball at a time to pass from the tube 40, any suitable arrangement may be provided; for example, there may be provided a pair of stop pins 42 and 43 the ends of which extend into the tube. These pins are pivotally carried by a rocking lever 44, pivoted as at 45. The lever 44 is normally urged by a spring 46 to a position where the second pin 43 projects downwardly in the front of the first ball in the tube 40 so as to hold that ball back during the gauging operation of the previously delivered ball. When the carriage reaches the end of its ejection stroke, a stem 47 of the lever engages against a stop 48, whereupon the lever is rocked to the position shown in Fig. 1, resulting in the ball which was being held back by the pin 43 dropping out of the delivery end of the spout or tube 40, and also resulting in the other pin 42 moving downwardly so as to hold the remaining balls back in the tube. When the carriage starts on its gauging stroke, the arm 47 is withdrawn from the stop 48, whereupon the spring 46 will turn the lever 44 to its normal position first described.

The carriage, together with the parts supported thereon, may be reciprocated in any desired manner, but by way of exemplification there is shown an arrangement for this purpose which comprises a crank arm 50 eccentrically connected by a bolt 51 to a disk or crank 52 secured to a shaft 53 having a drive pulley 54 about which may pass a motor driven belt (not shown).

For the purpose of advancing or feeding a ball, which has been delivered onto the surface 21, up to and by the gauge point 23 (as shown in Fig. 6), there is provided a lever having a pair of arms 55 and 56 and a cam 57 for moving the lever. The arms 55 and 56 are carried by a hub 58 journaled on a post 59 arising from the carriage slide 13. There is a sufficient friction between the post 59 and the hub or sleeve 58 to hold the levers in any position until they are positively moved from that position. The arm 55 of the feeding lever has a toe 60 adapted to engage behind a ball which has been delivered to the surface 21. The free end of the arm 56 carries a roller 61 adapted to ride along the cam edge of the cam 57. This cam edge has a cam portion 62 slightly inclined relative to the line of movement of the carriage, and which is effective to slowly advance the ball during the gauging operation; that is, to move the ball from the full line position, shown in Fig. 6, to the dot-and-dash line position in advance of the gauging point. The carriage, having completed its gauging stroke, will now be moved on its delivery stroke, and during such delivery stroke the lever will be moved (as hereinafter described) to the dash line position shown in Fig. 7 so as to eject the ball. To return the lever to its normal or initial position, shown by full lines in Figs. 6 and 7, there is a fixed cam 64 having a cam edge 65 against which the roller 61 engages while the carriage is completing its ejecting stroke, that is, its movement towards the right, referring to the drawings.

The ejection of the balls at selected stations in accordance with determined dimensions in size is effected through the lever 55 and a solenoid 66, the armature 67 of the latter being pivotally connected to the lever 55, as shown most clearly in Fig. 2. The coil of the solenoid is suitably supported on the carriage; for example, it may be mounted upon the bracket 14. When the solenoid is energized, the arm 55 is quickly advanced from the dash-and-dot line position of Fig. 7 to the dash line position of that figure, thereby causing the gauged ball to pass into the selected tube 35.

Figure 5:
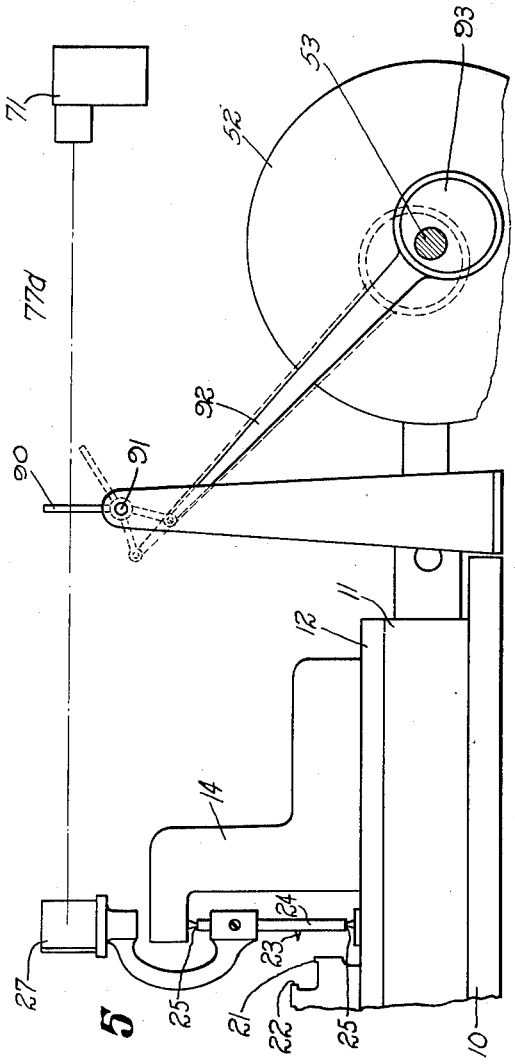
Fig. 5 is a front elevational view of what is shown in Fig. 4.

Energization of the solenoid 66 is controlled by a beam of light acting on a light sensitive device, such as a photo-electric cell 70, the instant at which the light ray affects that cell being determined by the angular position of the light reflecting device 26 (or 27) during the ejecting stroke of the carriage. Various optical systems may be employed, the main requirements being that the beam of light be relatively well defined and its effective length be such as to greatly magnify the displacement of the mirror 26 from normal, as established by the ball just gauged. Where the mirror 26 is associated with the gauging mechanism, as shown in Figs. 1 and 2, the optical system shown in Fig. 12 may be adopted to advantage. In that system, a source of light 71 may be positioned in front of the machine at a considerable distance, say fifty feet, and adjacent to that source of light may be positioned a fixed mirror 72. The photo-electric cell 70 may be carried by a slide 73 adjustably mounted on the top of a rail or support 74 located above the plane of the carriage and rearwardly of the carriage. The support 74 may bear on its forward face a suitable scale 75 with which cooperates a pointer 76 carried by the slide 73. The beam of light emanating from the source 71 is so directed that it will fall on the mirror 26 during that range of movement of the carriage during which the balls are ejected. The beam is reflected by this mirror onto the fixed mirror 72 which in turn so reflects the beam that, during the reciprocating movement of the carriage, the portion 77c of the beam will move in a plane which includes the photo-electric cell. That portion of the beam between the source of light and the mirror 26 is designated by the character 77b, and that portion coming from the mirror 72, by the character 77c.

Where the mirror 27 is associated with the gauging device, as illustrated in Figs. 4 and 5, the source of light 71 may be fixed or supported so that the beam 77d therefrom extends longitudinally of the line of movement of the carriage, and the reflected beam 77e may be directed forwardly by the mirror or prism to the photo-electric cell 70 located at a considerable distance in front of the machine. If desired, the reflected beam 77c may fall on a fixed mirror which, in turn, will direct the beam onto the cell positioned as shown in Figs. 1 and 2.

Any suitable system of electrical control between the light sensitive device or photo-electric cell and the ejecting mechanism may be employed, several such systems being shown in Figs. 8, 9, and 10. These systems are more or less schematically illustrated as their specific arrangements form no part of the present invention, and the various elements, diagrammatically illustrated, are well known in the electrical art. In the embodiment shown in Fig. 8, the photo-electric cell 70 is connected across the grid and plate of a vacuum tube 80 which is in a circuit which includes a relay 81. That relay controls a circuit which includes the ball ejecting solenoid 66. The filament of the vacuum tube 80 is in circuit with a commutator or circuit breaker which includes a spring finger or contact 82 and a rotary disk 83 against the periphery of which the member 82 engages. The disk 83 is made of metal and one-half of its periphery carries an insulating member 84 so that, during one-half of the revolution of the disk, current may pass through the filament while, during the other half revolution, the filament is rendered dead. This disk 83 is fixed to the shaft 53. The purpose of this rotary contactor is to render the vacuum tube inoperative during the measuring stroke of the machine in order that, during that stroke, the ball ejecting mechanism will not be operated. It is observed that, during the half cycle of the machine which comprises the measuring stroke, the beam of the light may strike the photo-electric cell, but it is necessary that that cell does not initiate, at that time, movement of the ejecting mechanism. On the return or ejecting stroke of the machine, the light may strike the photo-electric cell and, at that time, it is desired that the ejecting mechanism be operated. Obviously, the rotary contactor can be connected to any part of the electric circuit. For instance, it can be put in series with the ball ejecting solenoid circuit or in series with the photo-electric cell itself. The desired results may be obtained by breaking any connection whatsoever in the whole circuit. The contactor may be employed to advantage in the light source circuit, as shown in Fig. 11. In this case, the source of light 71 would be blanked out or shut off during the measuring stroke and would be turned on when the machine starts its ball ejecting stroke. Where the arrangement shown in Fig. 11 is employed, the electric wiring shown in Fig. 9 may be adopted between the photo-electric cell and the ball ejecting solenoid. In Fig. 9 the relay 81 is controlled through a vacuum tube amplifier 88.

Another way in which actuation of the ejecting mechanism during the measuring stroke of the machine may be avoided would be to interrupt the beam of light without affecting the source of light, and this may be done, for example, by a movable screen, as shown in Figs. 4 and 5. The screen, designated by the numeral 90, is pivoted, as at 91, so as to be moved into and out of the path of the beam or ray of light. This screen is operatively associated with the reciprocating mechanism for the carriage as, for example, by means of a crank or pitman 92 connected to one end of the screen and, at the other end having a strap fitting about an eccentric 93 fixed to the shaft 53. The eccentric 93 and the eccentric pin 51 are so angularly related that, during the measuring stroke, the screen is held in upright position to interrupt the light, as indicated by full lines in Fig. 5, and, during the ejecting stroke, the screen is lowered to the dotted line position shown in that figure. When this arrangement is employed, the wiring connections, shown in Fig. 9, may be used between the photo-electric cell and the ball ejecting mechanism, or the arrangement shown in Fig. 10 may be employed. By using the arrangement shown in Figs. 4 and 5 for interrupting the light and the electrical connections, shown in Fig. 10, all make and break devices, such as the relay and the rotary contactor of Fig. 8, are eliminated. In Fig. 10, the ball ejecting solenoid 66 is controlled by the cell 70 through a unit, designated by the numeral 95, which comprises a photo-electric amplifier in conjunction with a grid-glow tube through which may be passed a current of sufficient force to operate the ball ejecting solenoid 66. In Fig. 10, 96 designates a motor which may be used to drive the shaft 53. The motor 96, the source of light 71, and the electrical system between the cell 70 and the solenoid may be manually connected to the line by a switch 97.

In describing the general operation of the machine, it will be assumed that the mirror associated with the gauging device is set at an angle of forty-five degrees to the line of movement of the carriage, as illustrated in Figs. 4 to 7, inclusive; the source of light is positioned as shown in Figs. 4 and 5, and the photo-electric cell is positioned forwardly of the apparatus. It will also be assumed that a bunch or batch of balls varying in diameter between one-quarter of an inch and one-quarter of an inch minus one-ten-thousandths of an inch are to be assorted into four groups, according to size. In setting up the machine, the gauge block 16 may be adjusted by means of the screw 18 so that balls exactly one-quarter of an inch in diameter will cause slight or minimum displacement of the pointer 23 as those balls are fed between that point and the opposing gauging surface 22. Incidentally, the manner in which this gauge block is adjusted is of advantage in that adjustments may be very nicely and accurately had, backlash or loose play being eliminated, due to the fact that the spring 20 also urges the block against the screw 18. The screw 17 holds the block in adjusted position. The photo-electric cell is adjusted so that the ejecting mechanism would operate within the range of positions of the tubes 35 at the several stations. These adjustments may be had with reference to previously selected balls the diameter of which are absolutely known, or by preliminarily passing through the machine a plurality of the balls to be assorted. The cycle of operations may be considered as starting from the position of the parts shown in Figs. 1 and 2 and wherein the carriage is in its extreme right-hand position ready to start on its measuring stroke. When the carriage was completing its previous ball ejecting stroke, the arm 29 of the post 24 engaged the screw 28 so that the mirror 27 (the assumption being that the mirror is used) was moved back to zero, that is, to a position where the plane of the mirror is at an angle of forty-five degrees to the direction of movement of the carriage. Also, on the completion of the previous ball ejecting stroke, a ball was applied to the rear end of the track constituting the supporting surface 21 and the gauging surface 22, this ball being shown by broken lines in Fig. 2 and by full lines in Fig. 6. This ball is designated by the letter B. The carriage is now moved by the crank 52 on its measuring stroke, that is, towards the left, referring to the drawings, and during this stroke, the ball is gradually advanced up to and by the pointer 23 by the inclined surface 62 of the cam 57 acting through the lever arms 56 and 55. As a ball is moved past the pointer, it will move that pointer through an angular distance depending upon the diameter of the ball, and the mirror 27 will be correspondingly moved. In case the ball is one of the smaller ones, say exactly one-fourth of an inch, it will move the pointer but slightly, and when the ball is larger it will move the pointer through a larger angular distance. By the time the carriage has completed its ball measuring stroke, the ball has been moved to the forward end of the track ready to be delivered, as shown by the dot-and-dash line positions of Figs. 6 and 7. If the ball being gauged is within the range of sizes to be sorted, then during this measuring stroke, were it not for the screen 90, the beam of light would fall onto the mirror 27 which would reflect the beam onto the cell 70, resulting in operation of the ball ejecting mechanism. Operation of that mechanism, however, is not desired on the measuring stroke and, therefore, the beam of light is blanked out by the screen 90, or, if desired, the rotary contactor 83 may be used for rendering the optical system inoperative during the measuring stroke. The carriage, having completed its measuring stroke, will now move on its ball ejecting stroke, and during this stroke the mirror 27, the angular divergence from its normal forty-five degree angle having been determined by the ball just gauged and now to be delivered, will reflect the beam of light 77d, as indicated by the character 77e, in a plane which includes the photoelectric cell. During the ejecting stroke, the portion of the beam 77e will move from left to right and, at a predetermined point in the measuring stroke, which point is determined by the angular position of the mirror 27, the beam may strike the photo-electric cell causing, through the electrical connections described, energization of the ball ejecting solenoid 66 with the result that the arm 55 will be moved suddenly forwardly, thereby ejecting the ball at the selected station which corresponds to the size of the ball gauged. As the carriage is completing its ejecting stroke, the roller 61 of the ejecting mechanism will engage the return cam 64, whereupon the ejecting lever will be moved to the position shown by full lines in Figs. 6 and 7. Also, the mirror and the pointer will be moved to normal position by the screw 28, and another ball will be fed onto the track from the tube 40 through the mechanism which includes the pins 42 and 43.

It may be that some of the balls of the group or batch to be sorted are greater than or less than, the limits within which the balls are to be assorted. That is to say, in the specific instance here selected for illustration, some of the balls may be greater than one-quarter of an inch and others may be less than one-quarter of an inch less one ten-thousandths of an inch. In order to take care of these "oversize" and "undersize" balls, while permitting those balls within the selected range to be sorted into groups, the right-hand tube 35a is provided, and the machine is so set up that during the ejecting stroke of the carriage the beam of light will not be reflected by the mirror 27, as adjusted by the "oversize" or "undersize" ball, onto the photo-electric cell 70. Assume that an "undersize" ball is delivered to the carriage; that ball, on the measuring stroke, will not touch the pointer 23 and, therefore, not affect the position of the mirror 27. On the ejecting stroke, the beam of light reflected by the mirror 27 will not move to the right far enough to reach the photo-electric cell so that the ball will not be ejected on that ejecting stroke. When the carriage reaches the end of its ejecting stroke, another ball will be fed onto the track behind the "undersize" ball. The "undersize" ball is designated by the letter C in Fig. 6, and another ball B has been fed behind it, as just described. Now, when the carriage starts its next measuring stroke, the cam 62 will force the ball B forwardly and that ball will cause the "undersize" ball C to roll into the first tube 35a. In the case of an "oversize" ball, that ball, when it is fed past the gauging pointer 23, will move that pointer to an angular distance to such an extent that the reflected beam of light 77e will fall to the right-hand side of the photoelectric cell. Since, on the ejecting stroke, the carriage moves to the right, that reflected beam of light will not affect the photo-electric cell so the "oversize" ball will remain on the carriage until the carriage starts its next measuring stroke, as was the case with the "undersize" ball. When the carriage starts its next stroke, the "oversize" ball will be delivered to the tube or station 35a.

The operation of the machine, when the mirror 26 is normally positioned as shown in Figs. 1 and 2, and the optical system of Fig. 12 is employed, is generally similar to that just described. In this case, the mirror 26 reflects the light onto the fixed mirror 72 which, in turn, will reflect the light onto the photo-electric cell 70. The time at which the beam of light strikes the photo-electric cell during the ejecting stroke will depend upon the angularity of the mirror 26 which, in turn, will depend upon the ball gauged and now to be delivered.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed is:

1. In an apparatus of the character described, means for measuring the size of articles to be sorted and including a gauging element adapted to be moved selectively to several positions by the articles, a plurality of stations to which the gauged articles are to be selectively delivered according to size; light sensitive means for controlling the selective delivery of the gauged articles to said stations, and a light reflecting device operatively associated with said movable gauging member for movement to selected positions depending upon the sizes of the articles gauged, said reflecting device being arranged to reflect a beam of light onto said light sensitive means.

2. In an apparatus of the character described, a movable gauging instrumentality having a gauging element adapted to be selectively moved to various positions by the articles to be sorted, a plurality of stations to which the gauged articles are adapted to be selectively delivered according to size, a light sensitive device for controlling the delivery of the gauged articles from the gauging means to said stations, and a reflecting device associated and movable with said gauging element and arranged to reflect a beam of light onto said light sensitive device at points in the cycle of movement of said gauging means in accordance with the selected positions of said light reflecting device.

3. In an apparatus of the character described, means for gauging articles according to size and including a movable member, positions of which are determined by the individual articles brought into engagement therewith, a plurality of stations to which the gauged articles are selectively delivered according to size, means for selectively delivering the articles from the gauging means to the several stations, a light sensitive device for controlling said delivering means, and an optical system including a reflecting device operatively associated with said gauging member so as to move in accordance therewith and arranged to reflect a ray of light onto said light sensitive device at selective points in the cycle of operations.

4. In an apparatus of the character described, gauging means movable in a predetermined path and having a gauging element, positions of which are determined by the sizes of the articles to be sorted, a plurality of stations to which the articles are adapted to be delivered after they are gauged, light sensitive means for controlling the delivery of the gauged articles to respective stations according to size of the articles, and a reflector operatively associated with the movable gauging element and movable in accordance therewith, said reflecting device being adapted to reflect a beam of light onto said light sensitive means at selected points in the cycle of movement of the gauging means corresponding to the several stations.

5. In an apparatus of the character described, an instrumentality for gauging articles to be sorted, a light sensitive instrumentality for controlling the delivery of the articles, one of said instrumentalities being movable in a fixed path relative to the other one, a plurality of receiving members to which the articles are selectively delivered according to size, means for projecting a beam of light, and means actuated by said gauging means and controlling the point in the movement of said movable instrumentality at which the beam shall influence said light sensitive instrumentality.

6. In an apparatus of the character described, a reciprocating carriage, means on the carriage for gauging the articles according to size, a plurality of stations to which the gauged articles are selectively delivered according to size, light sensitive means controlling the selective delivery of the articles from the gauging means to the stations, and a device associated with the gauging means for directing a beam of light onto the light sensitive means at selected points in the cycle of movement of the carriage.

7. In an apparatus of the character described, a reciprocating carriage, gauging means on said carriage, a plurality of stations spaced apart longitudinally of the direction of movement of the carriage, means for ejecting the articles from the gauging means to the several stations, controlling means for said ejecting means and including a light sensitive device, a beam of light, and means associated with said gauging means for determining the points in the cycle of movement of said carriage at which said beam shall influence said light sensitive means.

8. In an apparatus of the character described, a reciprocating carriage, means on the carriage for gauging articles to be assorted according to size, means controlled by the reciprocating movement of the carriage for supplying the articles one by one to said gauging means, a plurality of stations to which the gauged articles are adapted to be selectively delivered according to size, means for ejecting the articles from the carriage to the several stations, a light sensitive device controlling said ejecting means, a beam of light adapted to influence said light sensitive means, and a reflector associated with the gauging means.

9. In an apparatus of the character described, a reciprocating carriage, gauging means thereon having a movable element the positions of which are determined by the articles gauged, a reflector associated with said element and movable in accordance therewith, means for feeding articles one by one to said gauging means, a plurality of stations to which the gauged articles are adapted to be selectively delivered according to size, a light sensitive means for controlling the delivery of the articles from the gauging means to the several stations, and light projecting means adapted to direct a ray of light onto said reflector and which in turn directs the ray onto said light sensitive means.

10. In an apparatus of the character described, a reciprocating carriage, means thereon for gauging articles one by one according to size, means for delivering the articles one by one to said carriage, a member adapted to move the articles on the carriage to the gauging means, a cam for moving said member on one stroke of the carriage to thereby feed the article up to and by the gauging means, a plurality of stations to which the gauged articles are adapted to be selectively delivered according to size, a light sensitive device operatively associated with said member for moving the same to eject the gauged articles selectively at the several stations in accordance with the size of the articles, and a reflector associated with the gauging device and adapted to direct a beam of light onto said light sensitive device during the other stroke of the carriage.

11. In an apparatus of the character described, a reciprocating carriage, means thereon for gauging articles one by one according to size, means controlled by the movement of the carriage for supplying articles one by one thereto, a member adapted to move the articles on the carriage to and past the gauging means, a cam for moving said member on one stroke of the carriage to advance the article, a cam for moving said member to normal position on the return movement of the carriage, a plurality of stations to which the gauged articles are adapted to be selectively delivered according to size, a solenoid connected to said member and adapted to move the same to such an extent as to eject the gauged article from the carriage, a light sensitive device electrically associated with said solenoid, and a reflector associated with the gauging device and adapted to direct a beam of light onto said light sensitive device during the ball ejecting stroke of the carriage.

12. In an apparatus of the character described, a bed, a reciprocating carriage thereon, means on the carriage for gauging articles one by one according to size, means controlled by the movement of the carriage for supplying articles one by one to the carriage, a lever pivoted to the carriage and adapted to move the articles on the carriage to and by the gauging means, a cam on the bed for slowly moving said member on the measuring stroke of the carriage to thereby feed the article up to and by the gauge means, a plurality of stations spaced apart in the direction of movement of the carriage and to which the gauged articles are adapted to be selectively delivered according to size, a cam on the bed for returning said lever to normal position on the ball ejecting stroke of the carriage, a light sensitive device operatively associated with said member for moving the same to eject the gauged articles selectively at the several stations in accordance with the sizes of the articles, and a reflector associated with the gauging device and adapted to direct a beam of light onto said light sensitive device during the ball ejecting stroke of the carriage.

13. In an apparatus of the character described, a movable gauging instrumentality having a gauging element adapted to be selectively moved to various positions by the articles to be sorted, a plurality of stations to which the gauged articles are adapted to be selectively delivered according to size, a light sensitive device for controlling the delivery of the gauged articles from the gauging instrumentality to said stations, means for supporting said light sensitive device for adjustment in the direction of movement of said gauging instrumentality, a scale for indicating the position of adjustment of said light sensitive device, and a reflector associated and movable with said gauging element and arranged to reflect a beam of light onto said light sensitive device.

14. In an apparatus of the character described, a reciprocating carriage having a measuring stroke and an ejecting stroke, means on the carriage for gauging the articles one by one according to size, a plurality of stations to which the gauged articles are adapted to be delivered selectively on the ejecting stroke, means for supplying the articles to the gauging means, means for ejecting the gauged articles on the ejecting stroke, light sensitive means controlling said ejecting means, a reflector associated with said gauging means, and means for preventing operation of the ejecting means on the gauging stroke of the carriage.

15. In an apparatus of the character described, a reciprocating carriage having a measuring stroke and an article ejecting stroke, means on said carriage for gauging the articles one by one according to size, a plurality of stations to which the gauged articles are adapted to be selectively delivered according to size, means for moving the articles to the gauging means during the gauging stroke of the carriage, means for ejecting the gauged articles on the ejecting stroke of the carriage, light sensitive means controlling said ejecting means, a reflector associated with said gauging means and selectively moved to predetermined position by the articles gauged, means for projecting a beam of light onto the reflecting means, and means for rendering the ejecting means inoperative on the gauging stroke of the carriage.

16. In an apparatus of the character described, a reciprocating carriage having a measuring stroke and an ejecting stroke, means on the carriage for gauging articles one by one according to size, a plurality of stations to which the gauged articles are adapted to be selectively delivered according to size, means for ejecting the gauged articles on the ejecting stroke of the carriage, light sensitive means controlling said ejecting means, a reflector associated with said gauging means and adapted to reflect a beam of light onto said light sensitive means, means for projecting a beam of light onto the reflector, and means for blanking the beam of light on the gauging stroke of the carriage.

17. In an apparatus of the character described, a reciprocating carriage having a measuring stroke and an ejecting stroke, means on the carriage for gauging articles one by one according to size, a plurality of stations to which the gauged articles are adapted to be selectively delivered according to size, means for ejecting the gauged articles on the ejecting stroke of the carriage, light sensitive means controlling said ejecting means, a reflector associated with said gauging means and adapted to reflect a beam of light onto said light sensitive means, means for projecting a beam of light onto the reflector, and a shutter operated in timed relation to the reciprocating movement of the carriage and arranged to interrupt the beam of light on the gauging stroke of the carriage.

18. In an apparatus of the character described, a reciprocating carriage having a measuring stroke and an ejecting stroke, means on the carriage for gauging the articles one by one according to size, a plurality of stations to which the gauged articles are adapted to be selectively delivered according to size, means for moving the articles to the gauging means during the gauging stroke of the carriage, means for ejecting the gauged articles on the ejecting stroke of the carriage, light sensitive means, electrical connections between said light sensitive means and ejecting means, a reflector associated with said gauging means and adapted to direct a beam of light onto said light sensitive means, and a rotary contactor driven in timed relation to the reciprocating movement of the carriage for rendering the electrical connections inoperative during the gauging stroke of the carriage.

19. In an apparatus of the character described, means for mechanically gauging articles to be sorted according to size and including two members between which the articles are moved, one of said members being movable relative to the other one, a plurality of stations positioned side by side and to which the articles gauged are selectively delivered, single means associated with said gauging means and common to, and movable relative to, said stations for selectively delivering the articles to said stations, a light sensitive device controlling said delivering means, and an optical system including a light reflecting member associated with said movable gauging element and arranged to reflect light onto said light sensitive device.

20. In an apparatus of the character described, a reciprocating member, means movable with said member for gauging the articles according to size, a plurality of stations to which the gauged articles are selectively delivered according to size, light sensitive means controlling the selective delivery of the articles from the reciprocating member to these stations, and a device associated with said gauging means for directing a beam of light onto the light sensitive means at selective points in the cycle of movement of said member.

21. In an apparatus of the character described, a reciprocating member, gauging means, a plurality of stations spaced apart longitudinally of the direction of movement of said member, means for causing the articles to be delivered from said reciprocating member to the several stations, controlling means including a light sensitive device, a beam of light, and means associated with said gauging means for determining the points in the cycle of movement of said member at which said beam shall influence said light sensitive means.

22. In an apparatus of the character described and in combination, a reciprocating carriage, a shaft journalled thereon and having a radially extending pointer, a track adapted to support the articles to be gauged and so positioned that when the articles are moved thereon they will move said pointer through an angular distance, means for moving the articles on one stroke of the carriage to and past said pointer, and means effective when the carriage completes its stroke in the opposite direction for returning the pointers to normal position.

HORACE H. RAYMOND.